No. 649,417. Patented May 8, 1900.
P. A. TOOMEY.
SKIRT GUARD FOR BICYCLES.
(Application filed June 4, 1898.)
(No Model.)
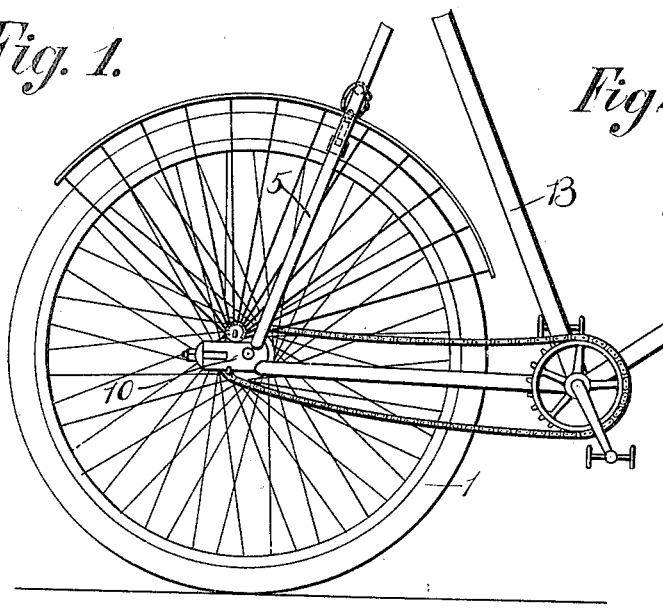
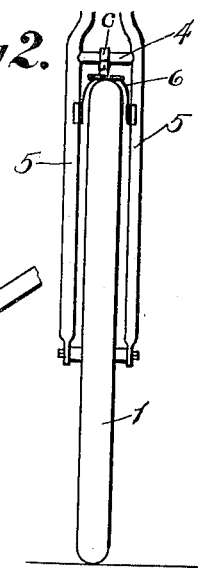
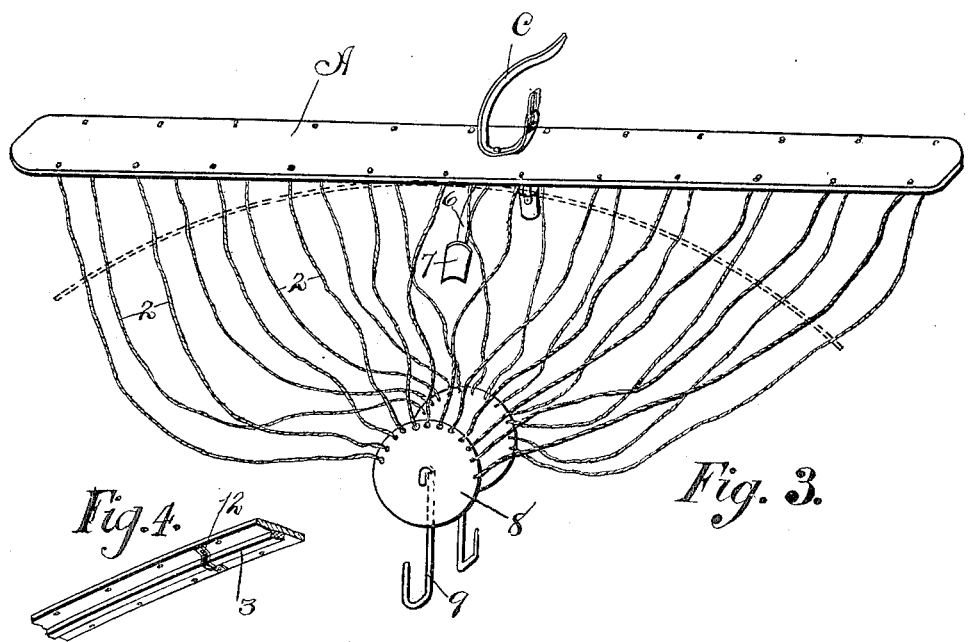
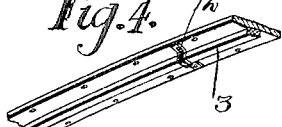
Witnesses:
R. A. White.
J. B. Stein.
Inventor
Patrick A. Toomey
by A. Miller Belfield, his Atty.

UNITED STATES PATENT OFFICE.

PATRICK A. TOOMEY, OF CHICAGO, ILLINOIS.

SKIRT-GUARD FOR BICYCLES.

SPECIFICATION forming part of Letters Patent No. 649,417, dated May 8, 1900.

Application filed June 4, 1898. Serial No. 682,603. (No model.)

*To all whom it may concern:*

Be it known that I, PATRICK A. TOOMEY, a citizen of the United States of America, and a resident of Chicago, county of Cook, and State of Illinois, have invented certain new and useful Improvements in Skirt-Guards for Bicycles, of which the following is a specification.

My invention relates in general to bicycle skirt-guards for holding the skirts of lady bicycle-riders away from the rear wheels of their bicycles. It relates in particular to devices of this class which involve a peripheral strip arranged and held in bent or curved condition around or above the upper portion of the periphery of the rear wheel, and a couple of shields, such as a plurality or network of laces or the like, extending on opposite sides of such wheel downwardly to an extent to cover a suitable portion thereof, and thereby prevent the rider's skirt from coming into contact with or rubbing against the same.

Prominent objects of my invention are to provide a simple, practical, and durable skirt-guard; to effectively prevent all catching or entangling of the skirt, either with the moving parts of the bicycle or with the device; to prevent sagging, loosening and opening of the side shields, and to arrange for automatically taking up any stretch or elongation that may occur in them; to dispense with all heavy metallic rods and stays for holding the device in place; to prevent loosening and rattling of the peripheral strip; to reduce to a minimum both the weight of the device and the expense of its construction; to arrange for the easy and quick attachment of the device to and detachment of the same from the frame of either a lady's or gentleman's bicycle, and particularly to provide a guard which shall permit ladies to ride gentlemen's bicycles.

To the attainment of the foregoing and other desired ends my invention consists in matters hereinafter set forth.

In the accompanying drawings, Figure 1 is a side elevation of the rear portion of a bicycle provided with a skirt-guard embodying my invention. Fig. 2 is a rear elevation of the same, showing the guard partly in transverse section. Fig. 3 is a perspective view, on a larger scale, of the guard unattached to the wheel; and Fig. 4 is a perspective view of a small portion of a modified and preferred form of guard.

The skirt-guard illustrated involves a long strip A, which is arranged and held in position above the rear wheel 1 of the bicycle B in a shape or form curved or bent substantially in correspondence with the periphery of such wheel. The guard illustrated also involves a plurality of lacing strings or cords 2 2, which converge inwardly and downwardly on opposite sides of the wheel 1 from the peripheral strip A and have their upper ends attached thereto and their lower ends held in position at or near the axle of the rear wheel, so as to form shields for the sides of rear wheel.

It will be understood that my invention contemplates the use of any other style of side shields for the rear wheel and is not intended in its broader features to be limited to side shields formed by radially-arranged laces, such as those shown.

In accordance with my invention the peripheral strip A is made of flexible and elastic material and of such a shape or form that when bent or curved into substantial correspondence with the wheel-periphery it will tend to lessen its extent or degree of curvature and assume a less bent or curved condition. In this way when and after the device is applied to the bicycle the peripheral strip A will always be under tension, tending to render it less curved, and so will continually draw upon the strings or cords 2 2 and hold them taut, it being understood, of course, that the strings or cords 2 2 are of such length as to extend from their point of connection or attachment near the wheel-axle outwardly to points equally and desirably beyond the periphery of the wheel 1. As a result the peripheral strip A will always be held in a firm and taut position above the wheel and will maintain its proper curvature, while at the same time the side shields formed by the lacing will also be held firm and taut, and thereby prevented from sagging, loosening, or opening. As further results all stretch or elongation of the shields will be taken up, the peripheral strip is effectively prevented from loosening or rattling, heavy metallic rods or stays for attaching the strip to the bicycle-frame are dispensed with, and the weight and expense of construction of the device are reduced to a minimum.

The periphery-covering strip A could be made of any flexible and elastic material and in any desired original form or shape. I prefer to make it out of nickel-aluminium, so as to have it not only properly flexible and elastic, but also light, strong, and durable as well. I also prefer to make it of a normally-straight form, as shown in Fig. 3, as being exceedingly simple, inexpensive to manufacture, and readily bendable into the desired curvature when placed upon the wheel. In such case it is conveniently made flat in cross-section, although obviously the invention contemplates any other suitable cross-section.

As a modified form and also as a matter of further improvement the strip A is provided with a rib or strip 3, which is attached to it, as by the strips 12 12 along its middle portion on its inner, lower, or concave face, as shown in Fig. 4, and serves to strengthen it, especially against transverse breaking or abrupt bending, and also to increase its tendency to assume a less-curved condition.

As a simple and quickly-operable means of attaching the strip A to the bicycle-frame the strip is provided with a strap or band C, preferably leather, which is secured to the strip A in position to permit of its being wrapped around and buckled to the cross-bar 4, Fig. 2, usually employed in bicycles as a connection between the two rear bars 5 5 at a point above the rear wheel. Of course if this cross-bar 4 is not found in a bicycle to which it is desired to attach the device, or even if it has such a cross-bar, the device can be attached thereto in any other way.

As an arrangement for holding the strip A firmly and yet detachably to the bicycle-frame it is provided with a couple of spring-arms 6 6, which project downwardly and outwardly from its opposite sides between the rear upright bars 5 5 and have their lower ends provided with concave clasps 7 7, which are forced against and engage the rear bars 5 5. The inner or concave surfaces of the clasps 7 7 are desirably provided with felt, leather, or the like, so as not to injure the frame-bars 5 5. It will be observed that these spring-arms 6 6 serve to hold the peripheral strip A against undesirable or permanent lateral and longitudinal movements relatively to the bicycle-frame, and at the same time they afford therewith a connection which is sufficiently elastic to allow the strip to accommodate itself readily to the jars and shocks received by the bicycle. It will also be observed that these spring-arms allow the easy and quick application of the guard to and detachment of the same from the bicycle-frame, for both results can be obtained by simply grasping the spring-arms between the fingers of the operator's hand, pressing them inwardly, so that they clear the frame-bars, and then either applying them thereto or withdrawing them therefrom, as desired. It will be observed, further, that these spring-arms allow the application of the same style or form of guard to all kinds of bicycles, whether single, double, or larger, and also to all styles of like vehicles, for be their upright bars far apart or near together, slanting or parallel with one another, or differing in other respects the spring-arms will always properly engage them at the desired point, for they can spring outwardly to any desired extent. It will be finally observed that these spring-arms are particularly well adapted for use in connection with an elastic strip and lacing attached thereto, such as shown herein, for they allow the strip to be applied at any convenient point between the bars and then moved upwardly until the strip assumes the proper degree of curvature and the lacing the proper degree of tautness.

The cords or strings 2 2 are conveniently attached to the strip A by passing them through a couple of series of holes respectively formed in opposite sides of the latter and by them forming knots on their ends. The lower ends of these strings or cords on the opposite sides of the rear wheel could be held in position at or near the axle thereof by any suitable devices, preferably by easily removable or detachable ones, so as to permit the easy removal or detachment of the guard from the bicycle. In the drawings I have illustrated a couple of simple and easily-operable devices for such purposes, which devices I consider advantageous and practical and matters of specific improvement, but to which I do not wish to limit myself in the broader conception of my invention.

The devices illustrated respectively comprise a disk or plate 8, shown circular in form, although of course not necessarily so, and adapted to serve as a common terminal for the cords or strings 2 2, and a hook 9, which connects the disk or plate 8 to the bicycle-frame. The upper half of the plate or disk 8 is provided near the periphery with a series of holes through which the cords or strings 2 2 can be passed and subsequently knotted, so as to secure them firmly thereto. The upper end of the hook 9 is bent and passed through a hole in the center of the plate or disk 9, so as to secure it firmly thereto and at the same time permit it to rotate about the same as an axis, so as to allow it to adjust itself to the direction of the resultant pull of all of the cords 2 2. The lower end of the hook 9 is bent so as to permit it to grasp the flat portion 10, usually formed in bicycle-frames at the junction of the rear upright bars 5 5 and the lower horizontal bars 11 11, so as to provide ample support for the rear-wheel bearing, as best shown in Fig. 1. By such arrangement the hooks 9 9 can be readily attached to and detached from the opposite sides of the bicycle-frame, so as to attach or detach the guard by sliding them either forward or backward, as the case may be, inside of the flat frame portions 10 10, so as to either cause their engagement therewith or disengagement therefrom. The length of the hooks 9 9 is desirably sufficient to allow the flat cord-holding disks or plates 8 8 to appear above the flat frame portion 10 10.

From the foregoing it will be observed that my device is simple, effective, and easily and quickly attachable and detachable, and that its principles permit of its easy and ready adaptation for attachment to various and different styles of bicycles. It will also be observed that it can be applied with equal facility either to a lady's or a gentleman's wheel and in either case is equally and highly effective, and, furthermore, that it is particularly well adapted for attachment to a gentleman's wheel, so as to allow a lady to ride the same and so allow one wheel to serve at different times for both a lady and a gentleman. As illustrative of the adaptability of this my improved guard particularly to a gentleman's wheel, I have shown such a wheel in the drawings and the guard applied to it.

It will be understood that although I have shown a plurality of separate strings or cords 2 2, each extending from the strip A to one of the plates or disks 8 8 and having its ends respectively connected thereto, I can employ equally well and without departing from the spirit of my invention a single long string or cord extending successively back and forth between the strip A and the disks 8 8 in the well-known way, and so forming a lacing substantially the same in character and effect as the lacing formed by the plurality of separate cords shown in the drawings. It will be further understood that many of the specific devices illustrated in the drawings and described herein and the particular forms or shapes thereof can be largely varied without departing from the essence of my invention, and therefore that I do not wish to limit myself either to such devices or to the specific forms thereof shown and described in case they are employed.

What I claim as my invention is—

1. A skirt-guard for bicycles, comprising a flexible and elastic strip adapted for arrangement in curved or bent condition about the periphery of the bicycle-wheel, and made so that when so arranged it will tend to assume a less curved or bent condition; means for attaching such strip to the frame or other stationary part of the bicycle so as to support it in proper position relatively to the wheel thereof; shields adapted for holding the skirt away from the opposite sides of the wheel, and attached at their outer ends to the opposite sides of the peripheral strip so as to hold the same in proper bent or curved condition and to be, in turn, held taut thereby when the device is applied to a bicycle; and means for attaching the inner ends of the shields to the frame or like stationary part of the bicycle.

2. A skirt-guard for bicycles, comprising a flexible and elastic strip adapted for arrangement in curved or bent condition about the periphery of the bicycle-wheel, and made so that when so arranged it will tend to assume a less curved or bent condition; means for attaching such strip to the frame or similar part of the bicycle, so as to support it in proper position relatively to the wheel thereof; lacing adapted for arrangement on opposite sides of the wheel and attached at intervals along the opposite sides of the peripheral strip so as to hold the same under tension in bent condition, and to be in turn held taut thereby, when the device is applied to a bicycle; and means for attaching the lacing to the frame or like stationary part of the bicycle.

3. A bicycle skirt-guard, comprising a flexible and elastic strip adapted for arrangement in curved or bent condition about the periphery of the bicycle-wheel, and made so that when so arranged it will tend to assume a less curved or bent condition; a strap or like device adapted for detachably attaching such strip to the rear cross-bar formed on the bicycle-frame above the rear wheel; means for holding the strip firmly and detachably between the rear upright bars of the bicycle; lacing attached at intervals along the opposite sides of the strip and adapted to extend downwardly therefrom on opposite sides of the wheel, so as to hold the strip under tension, and to be in turn held taut thereby, when the device is applied to a bicycle; and means for detachably attaching the lower ends of the lacing to the frame or similar stationary part of the bicycle.

4. A bicycle provided with a skirt-guard for its rear wheel, comprising a flexible and elastic strip arranged in curved or bent condition over the rear wheel and between the rear upright frame-bars, and made so that when so arranged it tends to assume a less curved or bent condition; means for attaching such strip to the bicycle-frame so as to support it in such position; skirt-shields arranged on opposite sides of the wheel and attached to the peripheral strip so as to hold the same in proper curved or bent condition; and be in turn held taut thereby; and means for attaching the lower ends of the shields to the frame or like part of the bicycle.

5. In a bicycle skirt-guard, a disk or plate to which the lacing can be attached; and a hook having its upper end secured to such disk or plate, and its lower end so formed as to permit of its sliding under and detachably engaging the portion of the bicycle formed at the junction of the rear upright and horizontal side bars.

6. In a bicycle skirt-guard, the combination of a peripheral strip; and a couple of spring-arms secured thereto, and adapted to spring outwardly and detachably engage the rear upright bars of the bicycle.

7. In a skirt-guard for bicycles or the like, the combination with a flexible and elastic strip adapted for arrangement in curved or bent condition about the wheel periphery, and made so that when so arranged it will tend to assume a less curved or bent condition; means for attaching such strip to the frame or other stationary part of the bicycle so as to support it in proper position relatively to the wheel thereof; spring-arms secured to the strip and adapted to spring outwardly and detachably engage upright bars on the bicycle; shields adapted for holding the skirt away from the opposite sides of the wheel, and attached at their outer ends to the opposite sides of the peripheral strip so as to hold the same in proper bent or curved condition, and to be, in turn, held taut thereby when the device is applied to a bicycle; and means for attaching the inner ends of the shields to the frame or like stationary part of the bicycle.

Signed by me at Chicago, Illinois, this 2d day of June, 1898.

PATRICK A. TOOMEY.

Witnesses:
A. MILLER BELFIELD,
WILBUR M. KELSO.